Jan. 25, 1944.  A. B. CLUNAN  2,340,260
PACKAGING EGGS AND THE LIKE
Filed July 12, 1940
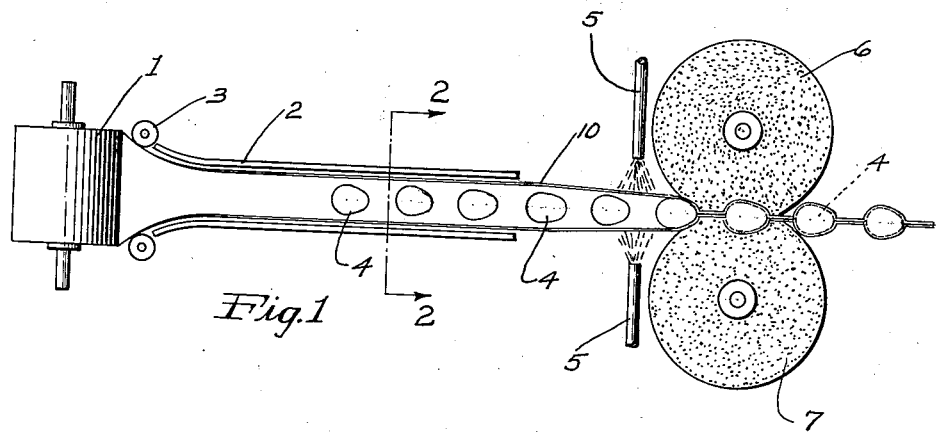
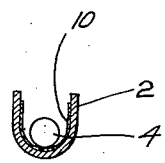
Fig.2
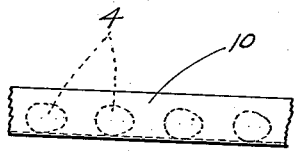
Fig.3
Inventor
Albert B. Clunan
By
Attorney Patented Jan. 25, 1944

2,340,260

UNITED STATES PATENT OFFICE 2,340,260

PACKAGING EGGS AND THE LIKE

Albert B. Clunan, Barberton, Ohio, assignor to Wingfoot Corporation, Akron, Ohio, a corporation of Delaware Application July 12, 1940, Serial No. 345,160

3 Claims. (Cl. 18—56)

This invention relates to packaging eggs and the like in rubber hydrochloride film.

It is customary to preserve eggs by submerging them in a water glass bath, or coating them with a silicate or the like, or otherwise protecting them from the action of the air.

According to this invention, eggs are protected from the air by enclosing them in an air-tight wrapper of rubber hydrochloride film. This is done preferably by individually enclosing a plurality of eggs in a sheet of film so that when the operation is completed, a number of the eggs will be enclosed and united in the same sheet.

The invention will be further described in connection with the accompanying drawing which shows means for wrapping eggs and similar objects. In the drawing Fig. 1 is a plan view of apparatus which may be employed. Fig. 2 is a cross section on the line 2—2 of Fig. 1, and Fig. 3 shows a number of eggs packaged in a single strip of the film.

The film used is taken from the roll 1. This may be rubber hydrochloride film of the type normally employed in packaging. It may be plasticized film or it may be unplasticized. Although colored film may be used, the transparent grades are preferred. The film may contain stabilizer such as hexamethylene tetramine. Ordinarily the film used will be between about .0008 and .002 inch and preferably about .001 of an inch thick. Unplasticized film of this thickness is preferred.

As the film is drawn from the roll, it passes through a trough 2. The guide rolls 3 aid in causing the film to lie flat in the trough. Any suitable means for bringing the film into the shape of a trough may be used. As the film 10 is drawn through the trough, the eggs 4 are gently laid on the film at suitably spaced intervals. The trough 2 or that portion of the trough where the eggs first contact the film is made of or lined with some suitable cushioning material to prevent breakage. The eggs may be laid in the trough by hand or by any suitable mechanical means.

As the film is drawn from the trough, it is heated. Any suitable heating means is used. Blasts of hot air from the pipes 5 are a preferred heating means. The film is preferably supported from below, especially while in the heated condition. Suitable supporting means (not shown) is used.

The heated film carrying the eggs is now drawn between two large cushioned rollers 6 and 7. These are preferably composed of sponge rubber. They are so soft that the heated film which does not contact the eggs is pressed together with sufficient pressure to unite the film, and yet without breaking the eggs. In automatic equipment there may be cavities in the rolls 6 and 7 so spaced as to receive the eggs and thus prevent or lessen the application of pressure on the eggs. The rolls 6 and 7 remove the air from between and around the eggs as they press the film together and stretch the heated film over the eggs and the wrapped eggs are withdrawn from the rollers enclosed in the rubber hydrochloride film. The heated film is pressed to the eggs by the spongy rolls 6 and 7. The eggs separately enclosed in the rubber hydrochloride film are united in a strip as shown in Fig. 3. The strip may be severed between the individual eggs or strips of a dozen, or any desired number of eggs may be cut off as the eggs come from between the rollers 6 and 7.

According to a modified operation, the film as it leaves the roll 1 is heated and stretched to several times its original length, so that the eggs are wrapped in the stretched thinner film. The heating required for stretching may be used also for sealing the film around the eggs. A single heating step may be used, and the blower pipes 5 may then be omitted.

Instead of eggs or dolls or any other frangible article may be similarly enclosed in rubber hydrochloride film.

I claim:

1. The method of wrapping a plurality of frangible articles in rubber hydrochloride film which comprises drawing a continuous sheet of film from a roll, folding the sheet to form a trough, placing the articles in the trough at spaced intervals on the film, and heating the film and then pressing portions of the film from opposite sides of the trough together to enclose the articles in individual pockets of rubber hydrochloride film, thereby stretching the film around the articles to conform to the shape thereof and uniting contacting portions of the film.

2. The method of packaging a plurality of frangible articles in rubber hydrochloride film which comprises shaping a continuous sheet of the film to form a trough, placing the articles in the trough at spaced intervals, heating the film and then stretching it over the articles, and pressing it together between the articles and around them with sufficient pressure to cause the contacting surfaces of the rubber hydrochloride film to unite and thereby form separate pockets of rubber hydrochloride around the individual articles.

3. The method of enclosing frangible articles in heat-sealable film which comprises shaping the film to form a trough and heating the film to make it heat-sealable, placing the articles in the shaped film at intervals and then bringing the heated film over the articles by passing them between two resilient rolls which unite the heated film above and between the articles.

ALBERT B. CLUNAN.